United States Patent [19]

Guest

[11] 4,088,349
[45] May 9, 1978

[54] HOSE CONNECTION EMPLOYING RELATIVELY SLIDABLE PARTS

[76] Inventor: Manuel T. Guest, 9548 Bisby St., Temple City, Calif. 91780

[21] Appl. No.: 783,977

[22] Filed: Apr. 4, 1977

[51] Int. Cl.² .................................................. F16L 33/00
[52] U.S. Cl. ....................................... 285/255; 285/382
[58] Field of Search ................. 285/255, 242, 382.2, 285/382, 421, 243

[56] References Cited

U.S. PATENT DOCUMENTS

| 362,697 | 5/1887 | Albee et al. | 285/243 |
|---|---|---|---|
| 1,157,997 | 10/1915 | Meeks | 285/243 |
| 3,674,292 | 7/1972 | Demler | 285/382 X |
| 3,687,491 | 8/1972 | Marshall | 285/242 |
| 3,827,727 | 8/1974 | Moebius | 285/417 X |
| 3,860,268 | 1/1975 | Zeman | 285/255 X |
| 8,868,130 | 2/1975 | Schwertner et al. | 285/243 |

FOREIGN PATENT DOCUMENTS

| 986,617 | 4/1951 | France | 285/255 |
|---|---|---|---|
| 2,052,293 | 5/1971 | Germany | 285/255 |
| 13,056 | 8/1971 | Japan | 285/255 |
| 10,264 of | 1906 | United Kingdom | 285/243 |
| 328,787 | 5/1930 | United Kingdom | 285/243 |
| 808,984 | 2/1959 | United Kingdom | 285/242 |
| 1,251,202 | 10/1971 | United Kingdom | 285/255 |
| 1,431,227 | 4/1976 | United Kingdom | 285/255 |

Primary Examiner—Thomas F. Callaghan
Attorney, Agent, or Firm—William W. Haefliger

[57] ABSTRACT

An assembly to secure a hose end portion onto a tubular fitting comprises a. an exially extending tubular nipple initially closely receivable onto the hose end portion over the fitting, the nipple having an annular, axially tapering, outer clamp surface oriented to taper toward the end of the hose on the fitting, and b. a clamp ring initially receivable onto the fitting to face co-axially toward the nipple, the ring having an axially tapered bore flaring toward the nipple and displaced axially onto the nipple outer clamp surface in compressively clamping relation therewith, thereby to tightly clamp the hose to the fitting.

8 Claims, 7 Drawing Figures

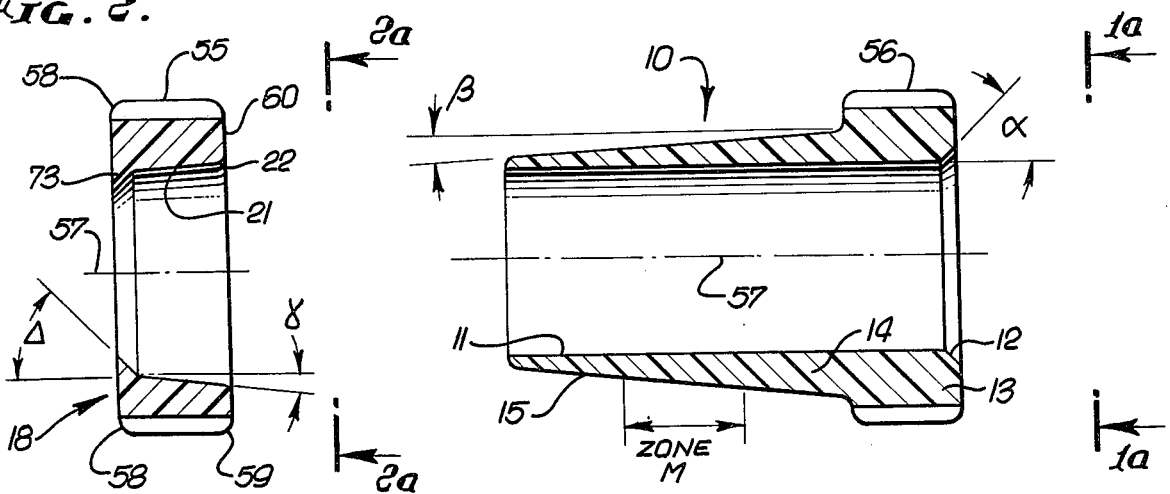
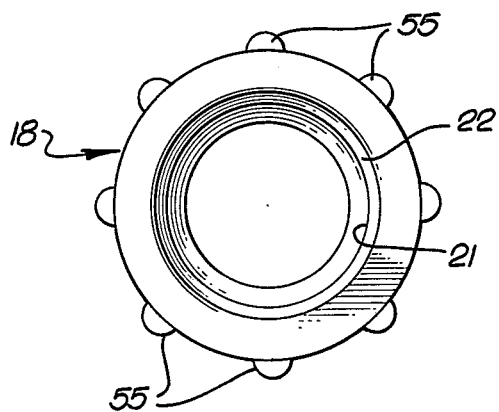
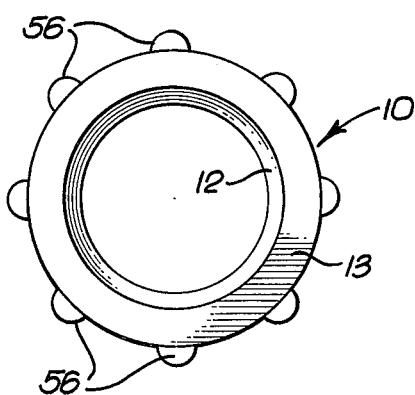
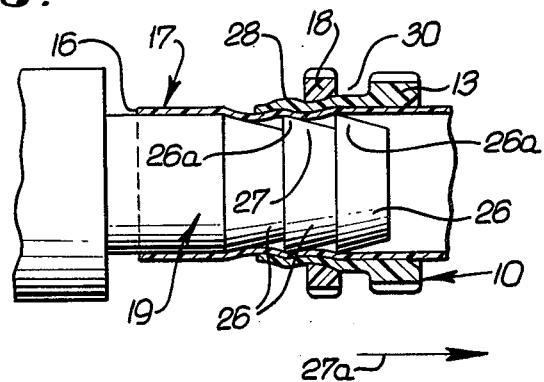
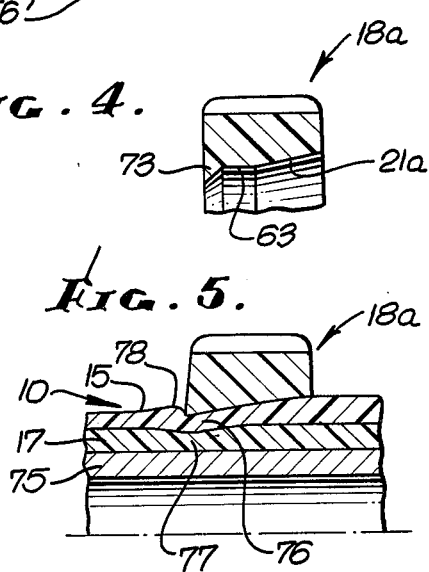

HOSE CONNECTION EMPLOYING RELATIVELY SLIDABLE PARTS

BACKGROUND OF THE INVENTION

This invention relates generally to hose connections, and more particularly concerns a very simple nipple and ring combination especially well suited to sealingly clamp a hose to a metal fitting.

Many different types of connections have been proposed in the past to connect plastic or other hose end portions to metallic fittings. A common type fitting involves parts which have threaded interfit and which serve to create clamping force holding the hose onto the fitting. Assembly of such parts requires their relative rotation, which is extremely difficult where the part to be rotated is a frictional clamping engagement with the hose. Also, threaded parts are more costly than unthreaded parts.

SUMMARY OF THE INVENTION

It is a major object of the invention to provide a very simple assembly to connect a hose onto a tubular fitting, the assembly characterized by the employment of clamping parts which are not threaded and therefore need not be relatively rotated to effect the connection. Basically, the invention is embodied in the combination which includes:

a. an axially extending tubular nipple initially closely receivable onto the hose end portion over the fitting, the nipple having an annular, axially tapering, outer clamp surface oriented to taper toward the end of the hose on the fitting, and b. a clamp ring initially receivable onto the fitting to face co-axially toward the nipple, the ring having an axially tapered bore flaring toward the nipple and displaced axially onto the nipple outer clamp surface in compressively clamping relation therewith, thereby to tightly clamp the hose to the fitting.

As will be seen, the nipple and clamp may consist of plastic material proportioned so that the nipple is capable of radially inward local constriction to displace a hose end portion into a space intermediate serration crests on the fitting, thereby to inter-lock the nipple and ring and also to effect a tight connection of the hose to the fitting and a seal therebetween; the ring may have a bore with taper similar to the taper of the outer ramp surface of the nipple section on which the ring is slidable to effect the connection, thereby to facilitate relative movement of the ring toward a flange on the nipple; a locking part may be integrated with the ring; the flange and ring may be drawn relatively together by simple finger and thumb pressure; also disassembly is facilitated by prying apart the ring and flange; and protrusions may be provided on the ring and flange to facilitate assembly and disassembly.

These and other objects and advantages of the invention, as well as the details of an illustrative embodiment, will be more fully understood from the following description and drawings, in which:

DRAWING DESCRIPTION

FIG. 1 is a side elevation, in section, of a clamp nipple;

FIG. 1a is an end view on lines 1a—1a of FIG. 1;

FIG. 2 is a side elevation, in section, of a clamp ring;

FIG. 2a is an end view on lines 2a—2a of FIG. 2;

FIG. 3 is a side elevation, partly in section, of an assembly embodying the FIG. 1 and FIG. 2 nipple and ring;

FIG. 4 is a section showing a modified ring; and

FIG. 5 is a section showing the FIG. 4 ring applied to a nipple on a hose received on metal tubing.

DETAILED DESCRIPTION

Referring first to FIG. 1, an axially extending tubular nipple 10 has a straight bore 11 and flaring bore mouth 12 the flare angle $\alpha$ for example being about 45°. It also includes a flange 13 of greater axial thickness than the radial thickness of the nipple tubular portion 14. The latter has an outer clamp surface 15 which tapers axially endwise away from the flange 13. Referring to FIG. 3, the taper of surface 15 is toward the end 16 of a tubular hose 17. The axial taper angle $\beta$ of surface 15 is, for example, about 5°. The axial length of the surface 15 is substantially greater than the axial length of clamp ring 18, seen in FIG. 2, so that the ring is progressively slidably receivable along the ramp surface 15 to lock the nipple to the hose 17, and the hose to tubular fitting 19, in the manner that will be later described.

Ring 18 has a bore section 21 which flares toward the nipple so as to be slidable onto surface 15 and relatively therealong, in progressively increasing clamping relation with same as the ring approaches flange 13. Finger pressure on the flange and ring serves to pull the ring toward the flange, upon assembly, whereby increasing clamping force, exerted radially inwardly, squeezes and constricts the nipple section radially inwardly, beneath the ring location; further, the radially inward extent of such constriction increases as the ring moves toward the flange 13, due to the ramp angle $\beta$. The angularity $\gamma$ of the ring bore section 21, as indicated, is approximately the same as that of angle $\beta$, and may for example be about 5°. The ring also has another section 22 defining an annular mouth having substantially greater axial flare angularity than the angularity $\gamma$. This facilitates fitting of the ring onto the nipple section 14, and forcible sliding of the ring therealong to clamp the nipple section to the fitting 19. Mouth 22 may be rounded, as shown. The diameter of bore 21 is such that it comes into interference engagement with nipple surface 15 as the face 60 of the ring 18 approaches or rides over a mid zone M of surface 15.

The right also includes a radially inwardly projecting flange 73 which tapers at an angle $\Delta$ away from the nipple. That flange is at the narrowest axial end of the ring bore, and angle $\Delta$ is between 30° and 60°, and preferably about 45°. Flange 73 engages surface 15, deflects, and acts as a lock washer resisting relative movement of the ring on the nipple. The axial width (maximum) of flange 73 in typically about 0.015 inches.

Both the nipple (bushing) and ring typically consist of molded plastic material, as for example polypropylene, and the hose 17 typically consists of plastic material such as polyethylene, so as to be flexible. Note that the radial wall thickness of the ring 18 is substantially greater than the maximum radial wall thickness of nipple section 14, which it constricts.

The fitting 19 is typically tubular and metallic, and has ring-shaped serrations defined by a series of frusto-conical exterior wall portions 26. These taper toward the end of the fitting, i.e. in the direction of arrow 27a in FIG. 3. Other forms of serrations may be employed.

To assemble the connection, the nipple is first fed onto the hose 17, and the ring is placed on the fitting, in loose relation with the latter. The flaring mouths 12 and 22 face rightwardly, as shown in FIG. 3. Next, the hose end portion is pushed onto and over the fitting serrations, in a relatively leftward direction, as for example to the position shown. Then, the nipple is slid leftwardly along the hose and pushed over the hose extent that has previously been pushed over the serrations 26; and finally, the ring 18 is pushed relatively rightwardly onto the nipple and toward the flange 13. This typically results in locking of the ring on a portion of the nipple that lies radially over that portion 27 of a serration located between serration crests 26a; i.e. the nipple is constricted inwardly by the ring to constrict the hose toward portion 27, resulting in development of an annular "hill" 28, i.e. radially outward protrusion, of the nipple extent 14 to the left of the ring, and radially outwardly of a serration crest. That hill blocks leftward retraction of the ring off the nipple, except in response to extreme leftward force application to the ring 18; therefore, the parts will remain assembled as shown during vibration and other conditions, and until such time as disassembly is desired. The space 30 between the ring and nipple flange 13 may be used for insertion of a tool to pry the ring leftwardly, upon disassembly. Note further that the connection does not require threading of either the nipple or ring, and is therefore simpler and easier to use than threaded connections.

Other nipple and ring compositions include high density polyethylene, and NYLON for the ring.

Note further that the ring 18 and flange 13 may have outward protrusions 55 and 56 which are circularly spaced about axis 57. The user may grip the protrusions and thereby more easily assemble and disassemble the components on a hose and fitting. Finally, the corners of the ring 18 are rounded off, as shown at 58 and 59.

The FIG. 4 ring 18a shown in section, is like that of FIG. 2, except for the provision of a short cylindrical bore section 63 which is parallel to the ring axis. Section 63 is between flange 73 and tapered bore 21a, the latter corresponding to tapered bore 21 in FIG. 2. FIG. 5 shows the FIG. 4 ring applied to tapered surface 15 of nipple 10. The latter is closely received on plastic hose 17, which is in turn received on smooth surfaced, annular metal fitting 75. Note that the nipple is inwardly locally deformed at 76, which produces a clamping action radially inwardly deforming the hose at 77. Therefore, the hose is tightly and sealingly clamped to the metal fitting, and the bulge or hill 78 produced in the nipple locks the ring in position.

I claim:

1. In an assembly to secure a hose end portion onto a tubular fitting, the hose end portion received relatively leftwardly onto the fitting which projects rightwardly, the combination with said fitting and hose end portion comprising a. an axially extending tubular nipple initially closely received rightwardly onto the hose end portion, and spaced from the hose end, said nipple being circumferentially continuous from end to end the nipple having an annular, smooth, axially tapering, outer clamp surface oriented to taper relatively leftwardly toward the end of the hose on the fitting, the nipple pushed relatively leftwardly along the hose end portion to also extend about the fitting, and b. a clamp ring initially receivable relatively leftwardly onto the fitting to face co-axially toward the nipple, the ring having an axially tapered bore flaring relatively rightwardly toward the nipple and displaced axially relatively rightwardly onto the nipple outer clamp surface in compressively clamping relation therewith, thereby to tightly and radially clamp the hose to the fitting, c. the length of the nipple outer clamp surface taper being substantially greater than the length of the ring bore taper, d. the ring having an annular flange projecting radially inwardly from said flaring bore to locally constrict the nipple, e. the nipple and hose end portion consisting of non-metallic molded plastic material.

2. The combination of claim 1 wherein the clamp ring also consists of non-metallic molded plastic material, the nipple being sufficiently flexible to be compressively displaced radially inwardly for displacing the hose end portion into a space intermediate serrations formed by the fitting outer surface.

3. The combination of claim 2 wherein the ring consists of plastic material selected from the group that consists of polypropylene, high-density polyethylene, and NYLON.

4. The combination of claim 1 wherein the ring bore includes a main section defining a main bore having substantially lesser axial flare than another section, the main section having said compressive clamping relation with the nipple outer clamp surface, the other section defining said inner flange having locking relation with the nipple outer surface.

5. The combination of claim 4 wherein the axial angular taper of said ring bore main section is close to the axial angular taper of said nipple outer clamp surface.

6. The combination of claim 2 wherein the clamp ring displaces the nipple and hose radially inwardly so that a portion of the hose is displaced into said space and said inner flange directly overlying a serration blocks axially endwise displacement of the clamp ring off the nipple.

7. The combination of claim 5 including an exterior flange on and integral with the nipple and toward which the ring is drawn as the ring slides on the nipple toward hose clamping condition.

8. The combination of claim 7 including peripheral protrusions on the ring and flange, said protrusions being circularly spaced thereon.

* * * * *